(12) United States Patent
Lee et al.

(10) Patent No.: US 11,232,633 B2
(45) Date of Patent: Jan. 25, 2022

(54) 3D OBJECT CAPTURE AND OBJECT RECONSTRUCTION USING EDGE CLOUD COMPUTING RESOURCES

(71) Applicant: VanGogh Imaging, Inc., McLean, VA (US)

(72) Inventors: Ken Lee, Fairfax, VA (US); Xin Hou, Herndon, VA (US)

(73) Assignee: VanGogh Imaging, Inc., McLean, VA (US)

( * ) Notice: Subject to any disclaimer, the term of this patent is extended or adjusted under 35 U.S.C. 154(b) by 0 days.

(21) Appl. No.: 16/867,192

(22) Filed: May 5, 2020

(65) Prior Publication Data

US 2020/0357172 A1    Nov. 12, 2020

Related U.S. Application Data

(60) Provisional application No. 62/843,680, filed on May 6, 2019.

(51) Int. Cl.
*G06T 17/20* (2006.01)
*G06T 7/194* (2017.01)
(Continued)

(52) U.S. Cl.
CPC .............. *G06T 17/20* (2013.01); *G06T 7/194* (2017.01); *G06T 7/20* (2013.01); *G06T 7/50* (2017.01);
(Continued)

(58) Field of Classification Search
None
See application file for complete search history.

(56) References Cited

U.S. PATENT DOCUMENTS 5,675,326 A    10/1997 Juds et al.
6,259,815 B1    7/2001 Anderson et al.
(Continued)

FOREIGN PATENT DOCUMENTS

EP    1308902 A2    5/2003
KR    10-1054736 B1    8/2011
(Continued)

OTHER PUBLICATIONS

Rossignac, J. et al., "3D Compression Made Simple: Edgebreaker on a Corner-Table," Invited lecture at the Shape Modeling International Conference, Genoa, Italy (Jan. 30, 2001), pp. 1-6.
(Continued)

*Primary Examiner* — Frank S Chen
(74) *Attorney, Agent, or Firm* — Proskauer Rose LLP

(57) ABSTRACT

Described herein are methods and systems for three-dimensional (3D) object capture and object reconstruction using edge cloud computing resources. A sensor coupled to a mobile device captures (i) depth maps of a physical object, the depth maps including pose information, and (ii) color images of the object. An edge cloud device coupled to the mobile device via a 5G connection receives the depth maps and the color images. The edge cloud device generates a new 3D model of the object based on the depth maps and color images, when a 3D model of the object has not been generated. The edge cloud device updates an existing 3D model of the object based on the depth maps and color images, when a 3D model of the object has previously been generated. The edge cloud device transmits the new 3D model or the updated 3D model to the mobile device.

22 Claims, 5 Drawing Sheets

(51) Int. Cl.
    *G06T 7/20*         (2017.01)
    *G06T 19/20*       (2011.01)
    *G06T 7/70*         (2017.01)
    *G06T 7/50*         (2017.01)
    *H04W 4/20*       (2018.01)

(52) U.S. Cl.
    CPC .............. *G06T 7/70* (2017.01); *G06T 19/20* (2013.01); *G06T 2200/04* (2013.01); *G06T 2207/10024* (2013.01); *G06T 2207/10028* (2013.01); *G06T 2207/20132* (2013.01); *H04W 4/20* (2013.01)

(56) References Cited

U.S. PATENT DOCUMENTS

| | | |
|---|---|---|
| 6,275,235 B1 | 8/2001 | Morgan, III |
| 6,525,722 B1 | 2/2003 | Deering |
| 6,525,725 B1 | 2/2003 | Deering |
| 7,248,257 B2 | 7/2007 | Elber |
| 7,420,555 B1 | 9/2008 | Lee |
| 7,657,081 B2 | 2/2010 | Blais et al. |
| 8,209,144 B1 | 6/2012 | Anguelov et al. |
| 8,542,233 B2 | 9/2013 | Brown |
| 8,766,979 B2 | 7/2014 | Lee et al. |
| 8,942,917 B2 | 1/2015 | Chrysanthakopoulos |
| 8,995,756 B2 | 3/2015 | Lee et al. |
| 9,041,711 B1 | 5/2015 | Hsu |
| 9,104,908 B1 | 8/2015 | Rogers et al. |
| 9,171,402 B1 | 10/2015 | Mien et al. |
| 9,607,388 B2 | 5/2017 | Lin et al. |
| 9,710,960 B2 | 7/2017 | Hou |
| 9,886,530 B2 | 2/2018 | Mehr et al. |
| 9,978,177 B2 | 5/2018 | Mehr et al. |
| 2005/0068317 A1 | 3/2005 | Amakai |
| 2005/0128201 A1 | 6/2005 | Warner et al. |
| 2005/0253924 A1 | 11/2005 | Mashitani |
| 2006/0050952 A1 | 3/2006 | Blais et al. |
| 2006/0170695 A1 | 8/2006 | Zhou et al. |
| 2006/0277454 A1 | 12/2006 | Chen |
| 2007/0075997 A1 | 4/2007 | Rohaly et al. |
| 2008/0180448 A1 | 7/2008 | Anguelov et al. |
| 2008/0310757 A1 | 12/2008 | Wolberg et al. |
| 2009/0232353 A1 | 9/2009 | Sundaresan et al. |
| 2010/0111370 A1 | 5/2010 | Black et al. |
| 2010/0198563 A1 | 8/2010 | Plewe |
| 2010/0209013 A1 | 8/2010 | Minear et al. |
| 2010/0302247 A1 | 12/2010 | Perez et al. |
| 2011/0052043 A1 | 3/2011 | Hyung et al. |
| 2011/0074929 A1 | 3/2011 | Hebert et al. |
| 2012/0056800 A1 | 3/2012 | Williams et al. |
| 2012/0063672 A1 | 3/2012 | Gordon et al. |
| 2012/0098937 A1 | 4/2012 | Sajadi et al. |
| 2012/0130762 A1 | 5/2012 | Gale et al. |
| 2012/0194516 A1 | 8/2012 | Newcombe et al. |
| 2012/0194517 A1* | 8/2012 | Izadi .................... G06T 7/20 345/420 |
| 2012/0306876 A1 | 12/2012 | Shotton et al. |
| 2013/0069940 A1 | 3/2013 | Sun et al. |
| 2013/0123801 A1 | 5/2013 | Umasuthan et al. |
| 2013/0156262 A1 | 6/2013 | Taguchi et al. |
| 2013/0201104 A1 | 8/2013 | Ptucha et al. |
| 2013/0201105 A1 | 8/2013 | Ptucha et al. |
| 2013/0208955 A1 | 8/2013 | Zhao et al. |
| 2014/0160115 A1 | 6/2014 | Keitler et al. |
| 2014/0176677 A1 | 6/2014 | Valkenburg et al. |
| 2014/0206443 A1 | 7/2014 | Sharp et al. |
| 2014/0240464 A1 | 8/2014 | Lee |
| 2014/0241617 A1 | 8/2014 | Shotton et al. |
| 2014/0270484 A1 | 9/2014 | Chandraker et al. |
| 2014/0321702 A1 | 10/2014 | Schmalstieg |
| 2015/0009214 A1 | 1/2015 | Lee et al. |
| 2015/0045923 A1 | 2/2015 | Chang et al. |
| 2015/0142394 A1 | 5/2015 | Mehr et al. |
| 2015/0213572 A1 | 7/2015 | Loss |
| 2015/0234477 A1 | 8/2015 | Abovitz et al. |
| 2015/0262405 A1 | 9/2015 | Black et al. |
| 2015/0269715 A1 | 9/2015 | Jeong et al. |
| 2015/0279118 A1 | 10/2015 | Dou et al. |
| 2015/0301592 A1 | 10/2015 | Miller |
| 2015/0325044 A1 | 11/2015 | Lebovitz |
| 2015/0371440 A1 | 12/2015 | Pirchheim et al. |
| 2016/0026253 A1 | 1/2016 | Bradski et al. |
| 2016/0071318 A1 | 3/2016 | Lee et al. |
| 2016/0171765 A1 | 6/2016 | Mehr |
| 2016/0173842 A1 | 6/2016 | De La Cruz et al. |
| 2016/0358382 A1 | 12/2016 | Lee et al. |
| 2017/0053447 A1 | 2/2017 | Chen et al. |
| 2017/0054954 A1 | 2/2017 | Keitler et al. |
| 2017/0054965 A1 | 2/2017 | Raab et al. |
| 2017/0221263 A1 | 8/2017 | Wei et al. |
| 2017/0243397 A1 | 8/2017 | Hou et al. |
| 2017/0278293 A1 | 9/2017 | Hsu |
| 2017/0316597 A1 | 11/2017 | Ceylan et al. |
| 2017/0337726 A1 | 11/2017 | Bui et al. |
| 2018/0005015 A1 | 1/2018 | Hou et al. |
| 2018/0025529 A1 | 1/2018 | Wu et al. |
| 2018/0114363 A1 | 4/2018 | Rosenbaum |
| 2018/0144535 A1 | 5/2018 | Ford et al. |
| 2018/0241985 A1 | 8/2018 | O'Keefe et al. |
| 2018/0288387 A1* | 10/2018 | Somanath ............ H04N 13/128 |
| 2018/0300937 A1 | 10/2018 | Chien et al. |
| 2018/0336714 A1 | 11/2018 | Stoyles et al. |
| 2019/0122411 A1 | 4/2019 | Sachs et al. |
| 2019/0208007 A1* | 7/2019 | Khalid .................. G06F 16/178 |
| 2019/0244412 A1 | 8/2019 | Yago Vicente et al. |
| 2020/0086487 A1* | 3/2020 | Johnson ............. G06K 9/00355 |
| 2020/0105013 A1* | 4/2020 | Chen ........................ G06T 7/75 |

FOREIGN PATENT DOCUMENTS

| | | |
|---|---|---|
| KR | 10-2011-0116671 A | 10/2011 |
| WO | 2006027339 A2 | 3/2006 |

OTHER PUBLICATIONS

Melax, S., "A Simple, Fast, and Effective Polygon Reduction Algorithm," Game Developer, Nov. 1998, pp. 44-49.

Myronenko, A. et al., "Point Set Registration: Coherent Point Drift," IEEE Transactions on Pattern Analysis and Machine Intelligence, vol. 32, No. 12, Dec. 2010, pp. 2262-2275.

Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.

Izadi, S. et al., "KinectFusion: Real-time 3D Reconstruction and Interaction Using a Moving Depth Camera," UIST '11, Oct. 16-19, 2011, 10 pages.

Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 8-12, 2010, 14 pages.

Biegelbauer, Georg et al., "Model-based 3D object detection—Efficient approach using superquadrics," Machine Vision and Applications, Jun. 2010, vol. 21, Issue 4, pp. 497-516.

Kanezaki, Asako et al., "High-speed 3D Object Recognition Using Additive Features in a Linear Subspace," 2010 IEEE International Conference on Robotics and Automation, Anchorage Convention District, May 3-8, 2010, pp. 3128-3134.

International Search Report and Written Opinion from PCT patent application No. PCT/US13/062292, dated Jan. 28, 2014, 10 pages.

International Search Report and Written Opinion from PCT patent application No. PCT/US14/045591, dated Nov. 5, 2014, 9 pages.

Sumner, R. et al., "Embedded Deformation for Shape Manipulation," Applied Geometry Group, ETH Zurich, SIGGRAPH 2007, 7 pages.

Rosten, Edward, et al., "Faster and better: a machine learning approach to corner detection," arXiv:08102.2434v1 [cs.CV], Oct. 14, 2008, available at https://arxiv.org/pdf/0810.2434.pdf, 35 pages.

Kim, Young Min, et al., "Guided Real-Time Scanning of Indoor Objects," Computer Graphics Forum, vol. 32, No. 7 (2013), 10 pages.

(56) References Cited

OTHER PUBLICATIONS

Rusinkewicz, Szymon, et al., "Real-time 3D model acquisition," ACM Transactions on Graphics (TOG) 21.3 (2002), pp. 438-446.
European Search Report from European patent application No. EP 15839160, dated Feb. 19, 2018, 8 pages.
Liu, Song, et al., "Creating Simplified 3D Models with High Quality Textures," arXiv:1602.06645v1 [cs.GR], Feb. 22, 2016, 9 pages.
Stoll, C., et al., "Template Deformation for Point Cloud Filtering," Eurographics Symposium on Point-Based Graphics (2006), 9 pages.
Allen, Brett, et al., "The space of human body shapes: reconstruction and parameterization from range scans," ACM Transactions on Graphics (TOG), vol. 22, Issue 3, Jul. 2003, pp. 587-594.
International Search Report and Written Opinion from PCT patent application No. PCT/US15/49175, dated Feb. 19, 2016, 14 pages.
Harris, Chris & Mike Stephens, "A Combined Corner and Edge Detector," Plessey Research Roke Manor, U.K. (1988), pp. 147-151.
Bay, Herbert, et al., "Speeded-Up Robust Features (SURF)," Computer Vision and Image Understanding 110 (2008), pp. 346-359.
Rublee, Ethan, et al., "ORB: an efficient alternative to SIFT or SURF," Willow Garage, Menlo Park, CA (2011), available from http://citeseerx.ist.psu.edu/viewdoc/download?doi=10.1.1.370.4395&rep=rep1&type=pdf, 8 pages.
Lowe, David G., "Distinctive Image Features from Scale-Invariant Keypoints," International Journal of Computer Vision, vol. 60, Issue 2, Nov. 2004, pp. 91-110.
Kaess, Michael, et al., "iSAM: Incremental Smoothing and Mapping," IEEE Transactions on Robotics, Manuscript, Sep. 7, 2008, 14 pages.
Kummerle, Rainer, et al., "g2o: A General Framework for Graph Optimization," 2011 IEEE International Conference an Robotics and Automation, May 9-13, 2011, Shanghai, China, 7 pages.

\* cited by examiner us
3D OBJECT CAPTURE AND OBJECT RECONSTRUCTION USING EDGE CLOUD COMPUTING RESOURCES

RELATED APPLICATIONS

This application claims priority to U.S. Provisional Patent Application No. 62/843,680, filed on May 6, 2019, the entirety of which is incorporated herein by reference.

TECHNICAL FIELD

This subject matter of this application relates generally to methods and apparatuses, including computer program products, for three-dimensional (3D) object capture and object reconstruction using edge cloud computing resources

BACKGROUND

With the start of the 5-G deployments, wireless/mobile computing systems and applications can now take advantage of 'edge' cloud computing and offload computationally intensive processing to the cloud. This has significant benefits in terms of being able to run computer vision applications that previously would have been too slow or would have consumed too much battery power, due to the inherent limitations of mobile devices. This is especially true in the case of 3D computer vision processing applications such as the 3D scanning technology described in:

the real-time object recognition and modeling techniques as described in U.S. Pat. No. 9,715,761, titled "Real-Time 3D Computer Vision Processing Engine for Object Recognition, Reconstruction, and Analysis;"

the dynamic 3D modeling techniques as described in U.S. patent application Ser. No. 14/849,172, titled "Real-Time Dynamic Three-Dimensional Adaptive Object Recognition and Model Reconstruction;"

the 3D model generation techniques as described in U.S. Pat. No. 9,710,960, titled "Closed-Form 3D Model Generation of Non-Rigid Complex Objects from Incomplete and Noisy Scans;"

the 3D photogrammetry techniques described in U.S. Pat. No. 10,192,347, titled "3D Photogrammetry;"

the sparse SLAM techniques described in U.S. patent application Ser. No. 15/638,278, titled "Sparse Simultaneous Localization and Mapping with Unified Tracking;"

the 2D and 3D video compression techniques described in U.S. Pat. No. 10,380,762, titled "Real-Time Remote Collaboration and Virtual Presence using Simultaneous Localization and Mapping to Construct a 3D Model and Update a Scene Based on Sparse Data;"

the 3D geometry reconstruction techniques described in U.S. patent application Ser. No. 16/118,894, titled "Enhancing Depth Sensor-Based 3D Geometry Reconstruction with Photogrammetry;"

the 3D tracking techniques described in U.S. patent application Ser. No. 16/123,256, titled "Combining Sparse Two-Dimensional (2D) and Dense Three-Dimensional (3D) Tracking;"

the 4D hologram generation and control techniques described in U.S. patent application Ser. No. 16/240,404, titled "4D Hologram: Real-Time Remote Avatar Creation and Animation Control;" and the object scanning techniques described in U.S. patent application Ser. No. 16/421,822, titled "Keyframe-Based Object Scanning."

Each of the above-referenced patents and patent applications is incorporated by reference herein in its entirety.

These types of 3D computer vision processing applications require much more computer processing power than typical 2D vision applications. And, existing non-5G wireless networks and corresponding mobile devices are not capable of providing the processing bandwidth and power necessary to efficiently and quickly perform these applications that would minimize or avoid excessive battery consumption and/or heat generation of the mobile devices.

SUMMARY

Therefore, the technology described herein advantageously utilizes edge cloud computing available in new 5G-based wireless networks for more reliable and robust implementation of real-time 3D computer vision capture technology using mobile devices—while also reducing excessive heat generation and battery consumption of said devices.

The invention, in one aspect, features a system for three-dimensional (3D) object capture and object reconstruction using edge cloud computing resources. The system comprises a sensor device, coupled to a mobile computing device, that captures (i) one or more depth maps of a physical object in a scene, the depth maps including related pose information of the physical object, and (ii) one or more color images of the physical object in the scene. The system comprises an edge cloud computing device, coupled to the mobile computing device via a 5G network connection, that receives the one or more depth maps and the one or more color images from the mobile computing device. The edge cloud computing device generates a new 3D model of the physical object in the scene based on the received one or more depth maps and one or more color images, when a 3D model of the physical object has not yet been generated. The edge cloud computing device updates an existing 3D model of the physical object in the scene based on the received one or more depth maps and one or more color images, when a 3D model of the physical object has previously been generated. The edge cloud computing device transmits the new 3D model or the updated 3D model to the mobile computing device.

The invention, in another aspect, features a computerized method of three-dimensional (3D) object capture and object reconstruction using edge cloud computing resources. A sensor device, coupled to a mobile computing device, captures (i) one or more depth maps of a physical object in a scene, the depth maps including related pose information of the physical object, and (ii) one or more color images of the physical object in the scene. An edge cloud computing device, coupled to the mobile computing device via a 5G network connection, receives the one or more depth maps and the one or more color images from the mobile computing device. The edge cloud computing device generates a new 3D model of the physical object in the scene based on the received one or more depth maps and one or more color images, when a 3D model of the physical object has not yet been generated. The edge cloud computing device updates an existing 3D model of the physical object in the scene based on the received one or more depth maps and one or more color images, when a 3D model of the physical object has previously been generated. The edge cloud computing device transmits the new 3D model or the updated 3D model to the mobile computing device.

Any of the above aspects can include one or more of the following features. In some embodiments, the mobile computing device crops the captured depth maps and color images prior to transmitting the captured depth maps and color images to the edge cloud computing device. In some embodiments, cropping the captured depth maps and color images comprises removing a portion of the captured depth maps and color images that corresponds to a background of the scene. In some embodiments, the edge cloud computing device performs the generating step, the updating step, and the transmitting step within less than 10 milliseconds after receiving the one or more depth maps and the one or more color images from the mobile computing device.

In some embodiments, updating an existing 3D model comprises tracking the physical object in the scene based upon the pose information received from the mobile computing device. In some embodiments, transmitting the updated 3D model to the mobile computing device comprises providing, to the mobile computing device, tracking information associated with the physical object in the scene based upon the tracking step. In some embodiments, the physical object is a non-rigid object.

In some embodiments, the edge cloud computing device performs one or more post-processing functions on the updated 3D model. In some embodiments, the one or more post-processing functions comprise a bundle adjustment process, a de-noising process, a mesh refinement process, a texture alignment process, a shadow removal process, or a blending process. In some embodiments, the edge cloud computing device generates a final 3D model from the updated 3D model after performing the one or more post-processing functions. In some embodiments, the edge cloud computing device transmits the final 3D model to the mobile computing device and/or to a cloud-based server computing device.

In some embodiments, a latency of the 5G network connection between the mobile computing device and the edge cloud computing device is less than 5 milliseconds.

Other aspects and advantages of the technology will become apparent from the following detailed description, taken in conjunction with the accompanying drawings, illustrating the principles of the technology by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION

Figure 1:
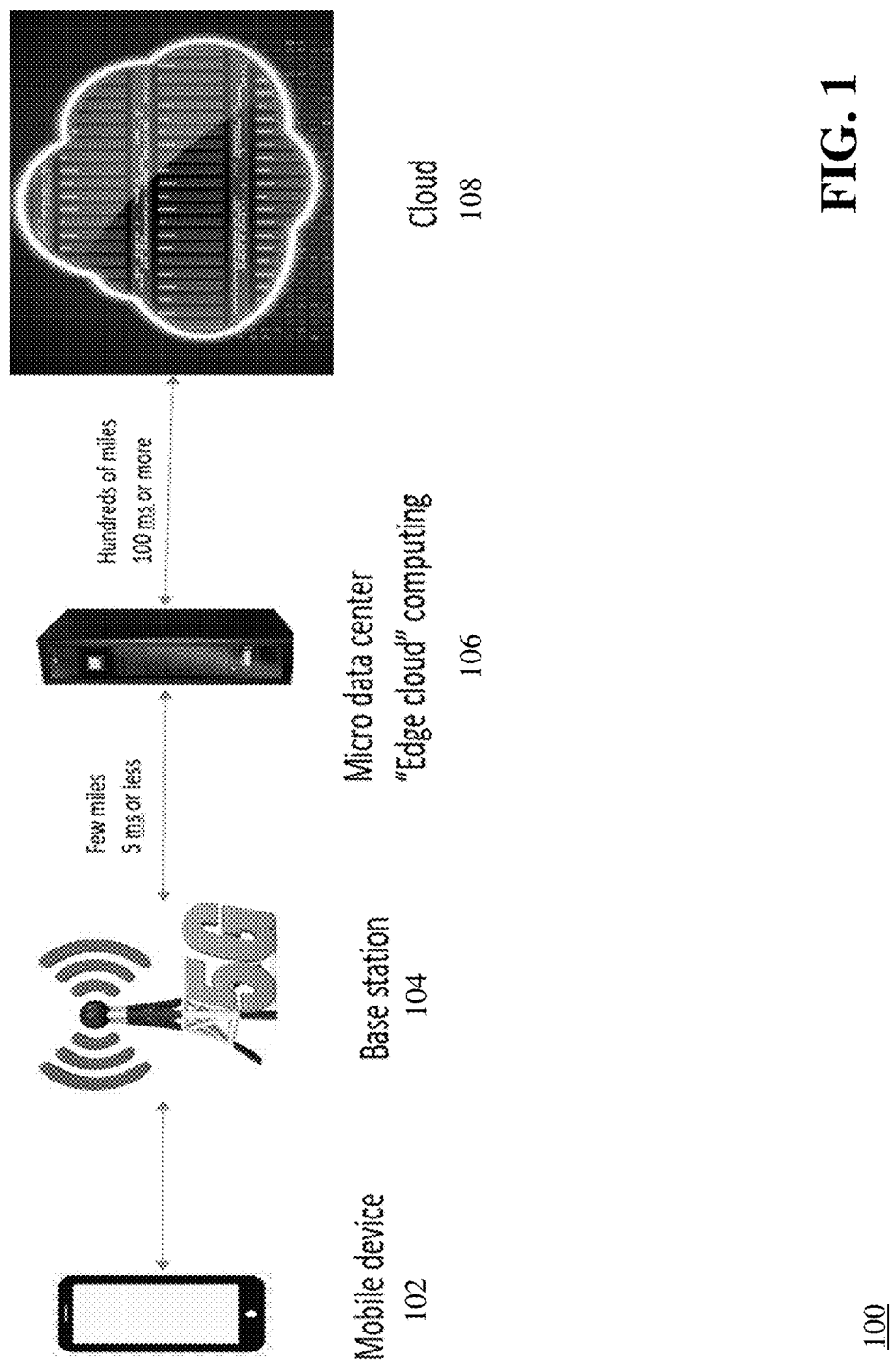
FIG. 1 is a block diagram of a system for three-dimensional (3D) capture using edge cloud computing resources.

FIG. 1 is a block diagram of a system 100 for three-dimensional (3D) capture using edge cloud computing resources. The system 100 includes a mobile device 102 (e.g., a smartphone, tablet, or other type of portable computing device that connects to a wireless network), a 5G base station 104, an edge cloud micro data center 106 (e.g., one or more computing devices on the 'edge' of the 5G network), and a cloud computing environment 108. As shown in FIG. 1, an application on the mobile device 102 connects to, and interacts with, the edge cloud micro data center 106 (e.g., via 5G base station 104) instead of having to connect to (or in addition to connecting to) the cloud computing environment 108. Because latency between the mobile device 102 and the edge cloud 106 is very small (e.g., less than 5 milliseconds) relative to the latency between the mobile device 102 and the cloud computing environment 108 (e.g., 100 milliseconds or more), the application on the mobile device 102 can perform much faster, in some cases with almost no latency. This is especially important for real-time computer vision applications which require very fast response between the processing resource (i.e., the edge cloud 106) and the user device (i.e., the mobile device 102).

Specifically, using the edge cloud 106 instead of the cloud computing environment 108 has following benefits for real-time 3D object capture and object reconstruction technology:

1. Object tracking is faster—because the edge cloud 106 provides a much more powerful computing resource (including, in some embodiments, a dedicated or shared GPU) versus a processor available in the mobile device 102, 3D object tracking applications provided by the mobile device are faster and more robust. This is because the edge cloud 106 can leverage its processing power to track at higher frames per second as well as use more robust 2D and 3D features—thus resulting in more accurate pose information used for 3D reconstruction.

2. 3D model quality is better—because the edge cloud 106 can utilize denser point clouds and higher resolution RGB images, the computation of which requires more processing power than is available on current mobile devices. Due to the processing strength and speed of the edge cloud, the time required to refine a 3D mesh and texturing a 3D object is also improved.

3. The edge cloud 106 enables the utilization of, and improves the performance of, extremely processing intensive techniques such as dynamic fusion to scan flexible objects (i.e., people) in real-time. Such processing is not currently possible on typical mobile devices.

Therefore, the availability of the edge cloud 106 allows for:

1. Processing of more object types such as smaller and large objects, flexible objects, and scene reconstruction.

2. Easier use of 3D object capture and tracking applications because tracking is more robust, and applications can handle faster movements of the camera and of the objects in a scene.

3. Higher quality 3D models, with greater details and photorealistic textures.

Figure 2:
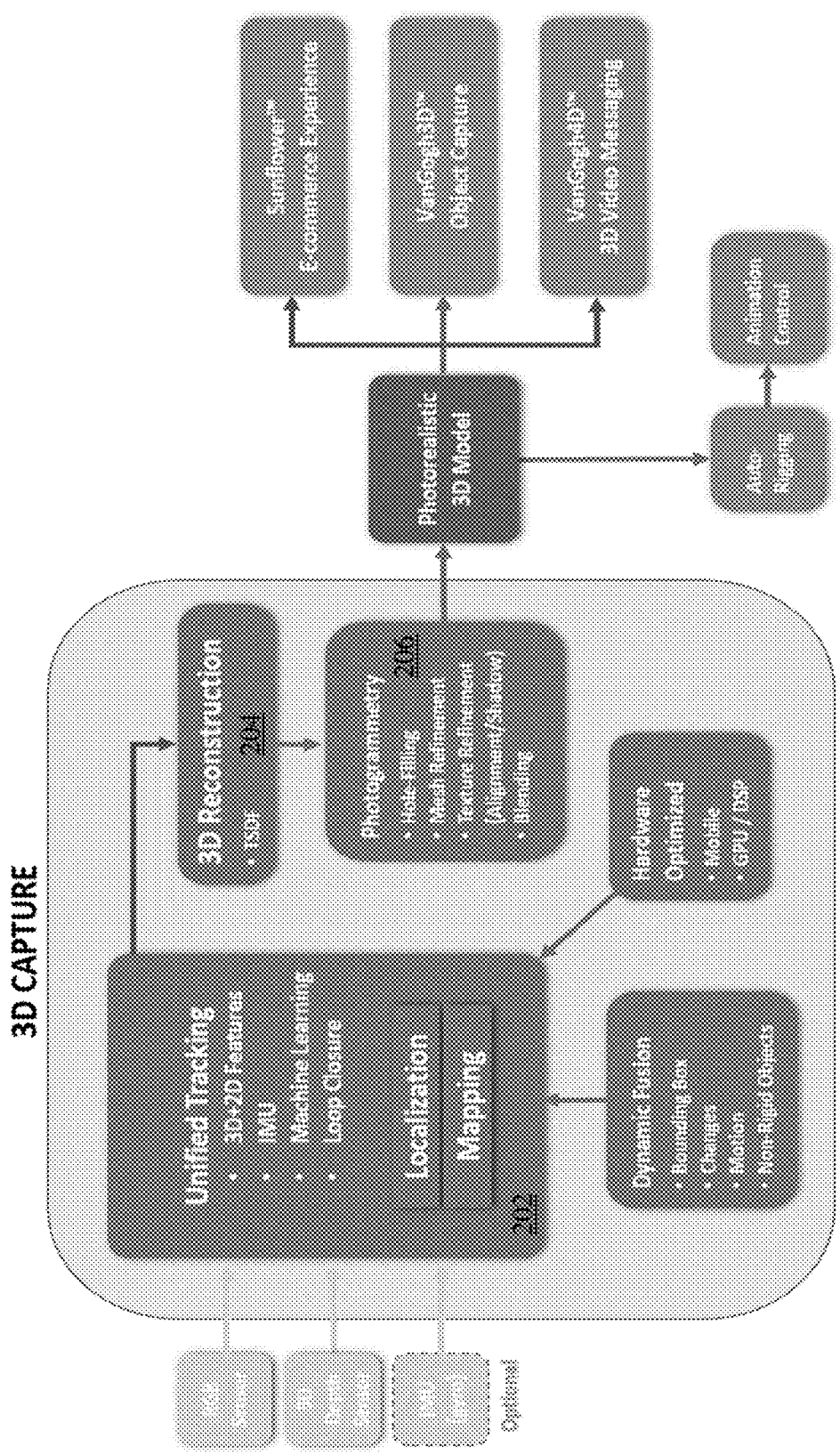
FIG. 2 is a flow diagram of a dynamic real-time 3D scanning workflow, using the system of FIG. 1.

FIG. 2 is a flow diagram of a dynamic capture real-time 3D scanning workflow, using the system 100 of FIG. 1. Dynamic capture refers to the scanning process where the mesh construction is being generated in real-time to provide feedback to the user on how much of the object or scene has been scanned so far. Dynamic capture also includes showing the quality of the mesh during the scanning process for any corrective action by the user. The main parts for the dynamic capture are tracking 202 and 3D reconstruction 204 (mesh)+ photogrammetry 206 (texture). This process allows capture of a high-quality 3D model using a mobile device 102.

Specific descriptions of the dynamic capture processes mentioned above are found in U.S. Pat. No. 9,715,761, titled "Real-Time 3D Computer Vision Processing Engine for Object Recognition, Reconstruction, and Analysis," as well as U.S. patent application Ser. No. 16/118,894, titled "Enhancing Depth Sensor-Based 3D Geometry Reconstruction with Photogrammetry," which are both incorporated herein by reference.

Generally, all the dynamic capture functions can run natively on the mobile device 102 without any cloud-based processing, which takes about one minute to scan and process. However, due to the processing power, heat, and battery consumption constraints of most mobile devices, many of these dynamic capture functions run at lower resolution and frame rates. As a result, the overall quality and reliability of the functions is limited.

One option is to use generic cloud-based processing (i.e., by connecting the mobile device 102 to a cloud computing environment 108). However, this is typically not feasible because of the more than 100 millisecond latency (in one direction) from the device 102 to the cloud computing environment 108 in typical wireless networks. Therefore, when the images are captured from the mobile device 102, it takes too long for the images to be processed and the resulting 3D model to be sent back to the mobile device 102. Because dynamic capture generally requires real-time interaction, the desired framework would have a minimum latency delay (i.e., less than a few milliseconds). Therefore, utilization of the edge cloud 106 overcomes this technical drawback.

Figure 3:
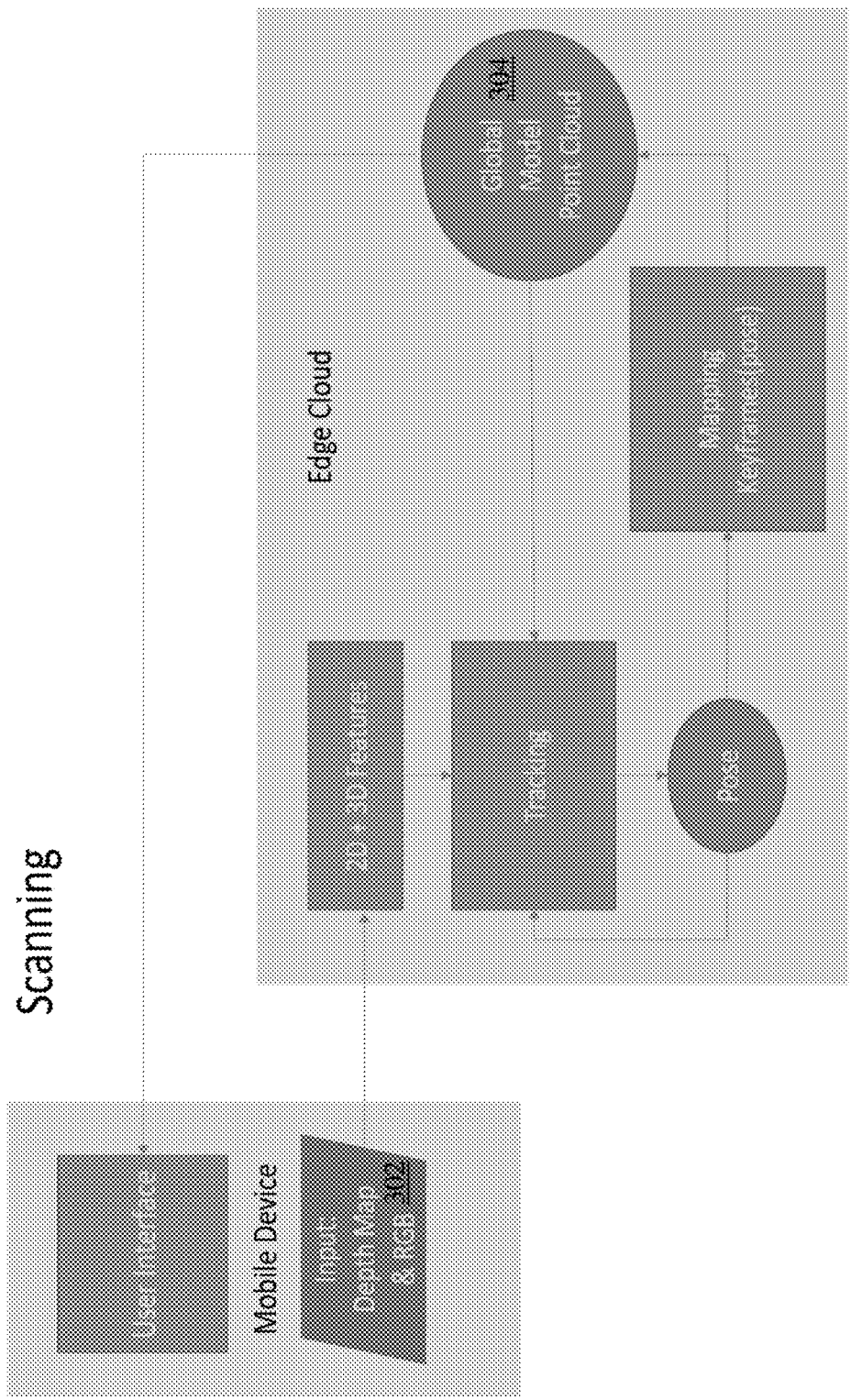
FIG. 3 is a flow diagram of a computerized method of utilizing edge cloud resources for object scanning and 3D model generation.
Figure 4:
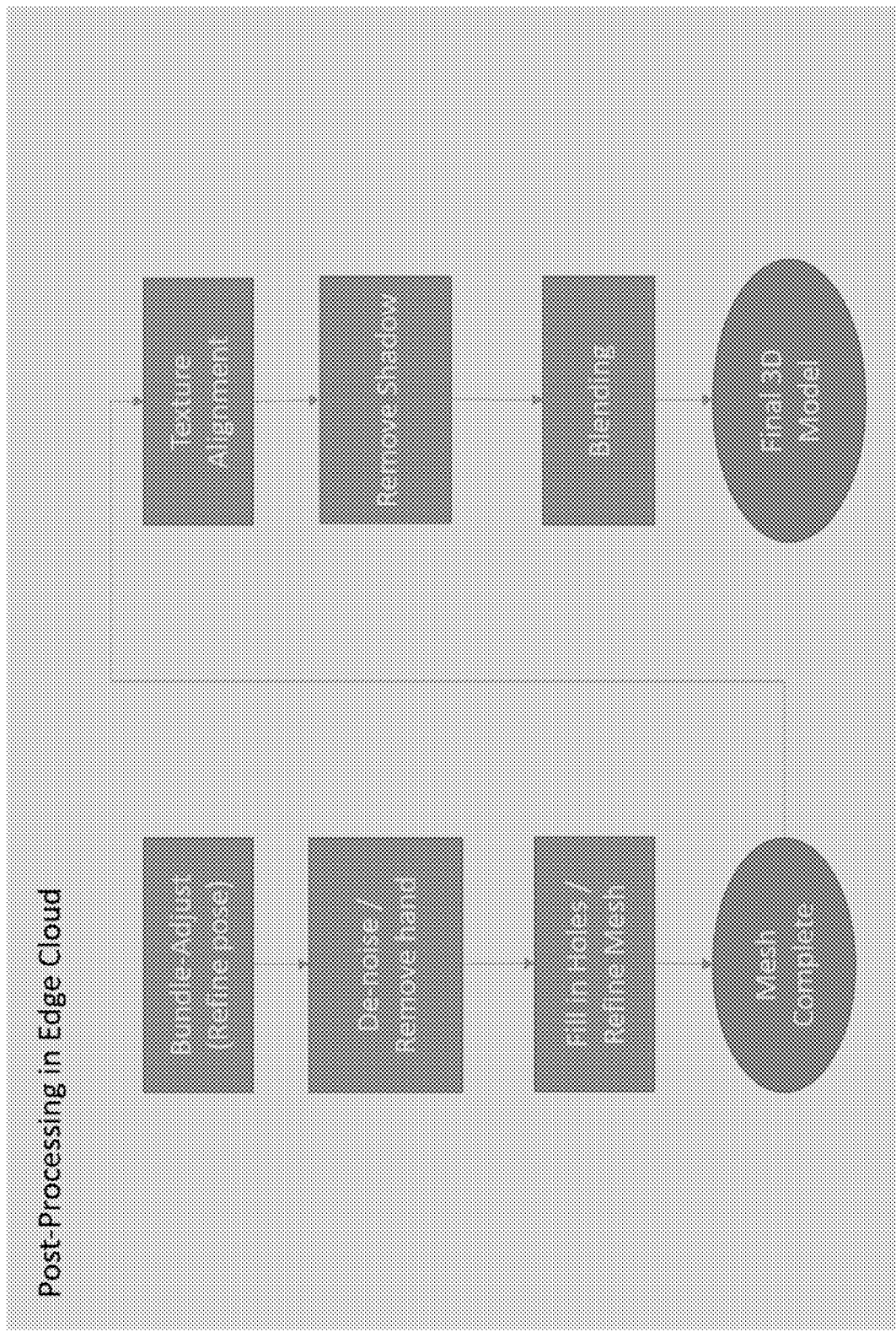
FIG. 4 is a flow diagram of a computerized method of utilizing edge cloud resources for 3D model post-processing and refinement.

FIG. 3 is a flow diagram of a computerized method 300 of utilizing edge cloud 106 resources for object scanning and 3D model generation. FIG. 4 is a flow diagram of a computerized method of utilizing edge cloud 106 resources for 3D model post-processing and refinement.

As shown in FIG. 3, once the mobile device 102 captures (302) the depth map and RGB images, the mobile device 102 sends the depth map and RGB images to the edge cloud 106 for object tracking and 3D model generation. After only a few milliseconds of processing, the edge cloud 106 provides real-time feedback to the mobile device 102 regarding the latest 'global model' (304) that has been scanned so far, using the steps as described in U.S. patent application Ser. No. 14/849,172, titled "Real-time Dynamic Three-Dimensional Adaptive Object Recognition and Model Reconstruction," (incorporated herein by reference), which describes the process of extracting 2D+3D features, tracking to capture the pose information, and performing 3D reconstruction. Some of the scan functions such as 2D+3D feature detection, tracking, and mapping can be done on-device, instead of the edge cloud, if sufficient amount of processing power is available on the mobile device. Therefore, it can be appreciated that the systems and methods described herein can be adapted in order to flexibly allocate how much of the functionality or processing can be done on the mobile device versus the edge cloud to save bandwidth or server cost.

After the scanning process, the rest of the post-processing steps (shown in FIG. 4) U.S. patent application Ser. No. 14/849,172, titled "Real-time Dynamic Three-Dimensional Adaptive Object Recognition and Model Reconstruction," as well as U.S. Pat. No. 10,192,347, titled "3D Photogrammetry" (incorporated herein by reference) clean up the mesh and add texture. The post-processing step(s) can be done entirely in the edge cloud 106 to generate the final 3D model.

In doing so, it is estimated that the overall scan time is reduced significantly, from one minute to a few seconds, battery consumption of the mobile device 102 is reduced by 80% or more, thermal heating problems on the mobile device 102 are eliminated, 1080p or higher RGB textures are added—making the entire process more reliable and easier to use.

Figure 5:
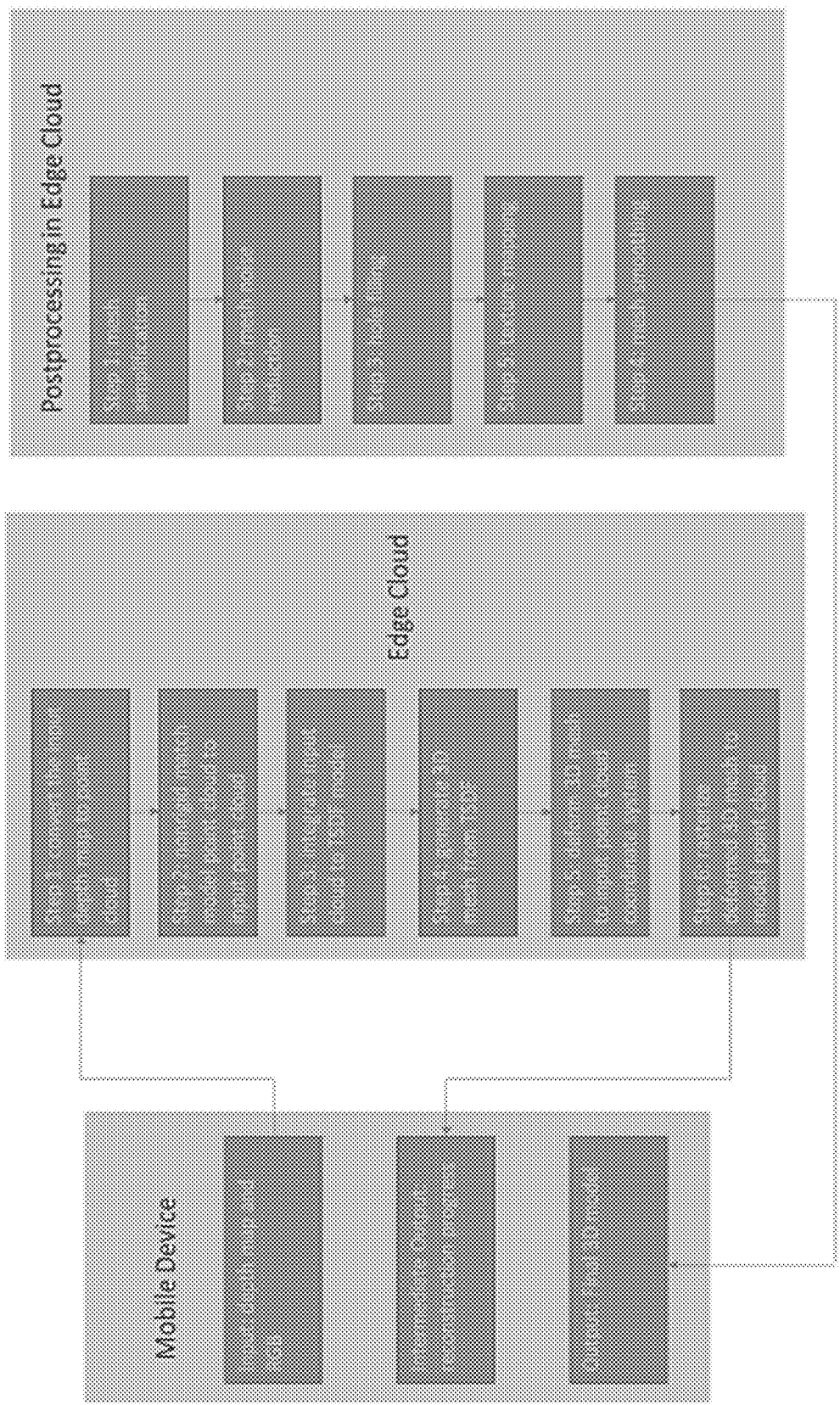
FIG. 5 is a flow diagram of a computerized method of utilizing edge cloud resources for non-rigid 3D reconstruction.

FIG. 5 is a flow diagram of a computerized method 500 of utilizing edge cloud 106 resources for non-rigid 3D reconstruction, using the system 100 of FIG. 1. FIG. 5 shows how a 'non-rigid' scanning process can leverage the edge cloud 106 resources to scan and track flexible objects, such as people. Similar to 3D capture, nonrigid 3D reconstruction builds a 3D model based on the depth map and color (RGB) images. However, instead of calculating a rigid pose, which is six degrees of freedom (6DOF), nonrigid 3D reconstruction calculates a non-rigid pose, which can be several thousand degrees of freedom. To achieve reliable and fast reconstruction, nonrigid 3D reconstruction heavily relies on GPU parallel computing, which makes it impossible to run on current-generation mobile devices.

In view of the above, the methods and systems described herein provides certain technological advantages, including but not limited to:

1) Leveraging 5G edge cloud architecture for real-time 3D capture;
2) Real-time feedback to a mobile device user of the 3D scan progress and quality;
3) Real-time tracking of objects and people that are being scanned; and
4) Reduction in the amount of bandwidth used between the mobile device 102 and edge cloud 106 by 'segmenting' the depth and RGB images intelligently based on the object pose.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A system for three-dimensional (3D) object capture and object reconstruction using edge cloud computing resources, the system comprising:
   a sensor device, coupled to a mobile computing device, that captures (i) one or more depth maps of a physical object in a scene, the depth maps including related pose information of the physical object, and (ii) one or more color images of the physical object in the scene;
   an edge cloud computing device, coupled to the mobile computing device via a 5G network connection, that:
   receives the one or more depth maps and the one or more color images from the mobile computing device;
   generates a new 3D model of the physical object in the scene based on the received one or more depth maps and one or more color images, when a 3D model of the physical object has not yet been generated;
   updates an existing 3D model of the physical object in the scene based on the received one or more depth maps and one or more color images, when a 3D model of the physical object has previously been generated, including tracking the physical object in the scene based upon the pose information received from the mobile computing device; and transmits the new 3D model or the updated 3D model to the mobile computing device.

2. The system of claim 1, wherein the mobile computing device crops the captured depth maps and color images prior to transmitting the captured depth maps and color images to the edge cloud computing device.

3. The system of claim 2, wherein cropping the captured depth maps and color images comprises removing a portion of the captured depth maps and color images that corresponds to a background of the scene.

4. The system of claim 1, wherein the edge cloud computing device performs the generating step, the updating step, and the transmitting step within less than 10 milliseconds after receiving the one or more depth maps and the one or more color images from the mobile computing device.

5. The system of claim 1, wherein transmitting the updated 3D model to the mobile computing device comprises providing, to the mobile computing device, tracking information associated with the physical object in the scene based upon the tracking step.

6. The system of claim 1, wherein the physical object is a non-rigid object.

7. The system of claim 1, wherein the edge cloud computing device performs one or more post-processing functions on the updated 3D model.

8. The system of claim 7, wherein the one or more post-processing functions comprise a bundle adjustment process, a de-noising process, a mesh refinement process, a texture alignment process, a shadow removal process, or a blending process.

9. The system of claim 7, wherein the edge cloud computing device generates a final 3D model from the updated 3D model after performing the one or more post-processing functions.

10. The system of claim 9, wherein the edge cloud computing device transmits the final 3D model to the mobile computing device and/or to a cloud-based server computing device.

11. The system of claim 1, wherein a latency of the 5G network connection between the mobile computing device and the edge cloud computing device is less than 5 milliseconds.

12. A computerized method of three-dimensional (3D) object capture and object reconstruction using edge cloud computing resources, the method comprising:
    capturing, by a sensor device coupled to a mobile computing device, (i) one or more depth maps of a physical object in a scene, the depth maps including related pose information of the physical object, and (ii) one or more color images of the physical object in the scene;
    receiving, by an edge cloud computing device coupled to the mobile computing device via a 5G network connection, the one or more depth maps and the one or more color images from the mobile computing device;
    generating, by the edge cloud computing device, a new 3D model of the physical object in the scene based on the received one or more depth maps and one or more color images, when a 3D model of the physical object has not yet been generated;
    updating, by the edge cloud computing device, an existing 3D model of the physical object in the scene based on the received one or more depth maps and one or more color images, when a 3D model of the physical object has previously been generated, including tracking the physical object in the scene based upon the pose information received from the mobile computing device; and
    transmitting, by the edge cloud computing device, the new 3D model or the updated 3D model to the mobile computing device.

13. The method of claim 12, wherein the mobile computing device crops the captured depth maps and color images prior to transmitting the captured depth maps and color images to the edge cloud computing device.

14. The method of claim 13, wherein cropping the captured depth maps and color images comprises removing a portion of the captured depth maps and color images that corresponds to a background of the scene.

15. The method of claim 12, wherein the edge cloud computing device performs the generating step, the updating step, and the transmitting step within less than 10 milliseconds after receiving the one or more depth maps and the one or more color images from the mobile computing device.

16. The method of claim 12, wherein transmitting the updated 3D model to the mobile computing device comprises providing, to the mobile computing device, tracking information associated with the physical object in the scene based upon the tracking step.

17. The method of claim 12, wherein the physical object is a non-rigid object.

18. The method of claim 12, wherein the edge cloud computing device performs one or more post-processing functions on the updated 3D model.

19. The method of claim 18, wherein the one or more post-processing functions comprise a bundle adjustment process, a de-noising process, a mesh refinement process, a texture alignment process, a shadow removal process, or a blending process.

20. The method of claim 18, wherein the edge cloud computing device generates a final 3D model from the updated 3D model after performing the one or more post-processing functions.

21. The method of claim 20, wherein the edge cloud computing device transmits the final 3D model to the mobile computing device and/or to a cloud-based server computing device.

22. The method of claim 12, wherein a latency of the 5G network connection between the mobile computing device and the edge cloud computing device is less than 5 milliseconds.

* * * * *